United States Patent
Kishida et al.

(10) Patent No.: US 9,645,352 B2
(45) Date of Patent: May 9, 2017

(54) IMAGE PICKUP APPARATUS

(71) Applicant: Panasonic Intellectual Property Management Co., Ltd., Osaka (JP)

(72) Inventors: Naotaka Kishida, Osaka (JP); Kenji Kawazoe, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/082,315

(22) Filed: Mar. 28, 2016

(65) Prior Publication Data

US 2016/0291287 A1    Oct. 6, 2016

(30) Foreign Application Priority Data

Mar. 30, 2015  (JP) ................................ 2015-068983
Feb. 15, 2016  (JP) ................................ 2016-025864

(51) Int. Cl.
| | | |
|---|---|---|
| *G03B 3/10* | (2006.01) | |
| *G03B 13/34* | (2006.01) | |
| *G02B 7/105* | (2006.01) | |
| *G02B 27/64* | (2006.01) | |

(52) U.S. Cl.
CPC .......... *G02B 7/105* (2013.01); *G02B 27/646* (2013.01); *G03B 3/10* (2013.01); *G03B 13/34* (2013.01)

(58) Field of Classification Search
CPC .......... G03B 3/10; G03B 13/34; G02B 7/105
USPC ........................................................ 396/131
See application file for complete search history.

(56) References Cited

U.S. PATENT DOCUMENTS

| | | | | | |
|---|---|---|---|---|---|
| 3,522,981 | A | * | 8/1970 | Klaus-Udo ............ | G02B 7/105 352/140 |
| 3,655,271 | A | * | 4/1972 | Suzuki .................. | G02B 7/105 359/706 |
| 3,841,735 | A | * | 10/1974 | Katagiri ................ | G02B 15/22 359/699 |
| 3,891,310 | A | * | 6/1975 | Hideo ................... | G02B 7/105 359/704 |
| 4,089,590 | A | * | 5/1978 | Sakata .................. | G02B 15/22 359/701 |
| 4,972,215 | A | * | 11/1990 | Kitamura .............. | G03B 3/10 396/86 |
| 8,045,045 | B2 | * | 10/2011 | Okawara ............... | G02B 7/102 348/208.11 |
| 2004/0184795 | A1 | | 9/2004 | Okawara | |
| 2009/0273702 | A1 | | 11/2009 | Okawara | |

FOREIGN PATENT DOCUMENTS

JP    2004-287038    10/2004

* cited by examiner

*Primary Examiner* — W B Perkey
(74) *Attorney, Agent, or Firm* — Wenderoth, Lind & Ponack, L.L.P.

(57) ABSTRACT

The image pickup apparatus has a focus lens that adjusts focus on a subject, an operating section (an MF operation ring) that accepts user's operation, and a focus-lens driver that drives the focus lens in response to the user's operation. The focus-lens driver drives the focus lens so that a rotation amount at the operating section, which is required for moving a focus position by unit distance, is maintained at a constant level with no regard to a subject distance.

3 Claims, 8 Drawing Sheets

FIG. 1
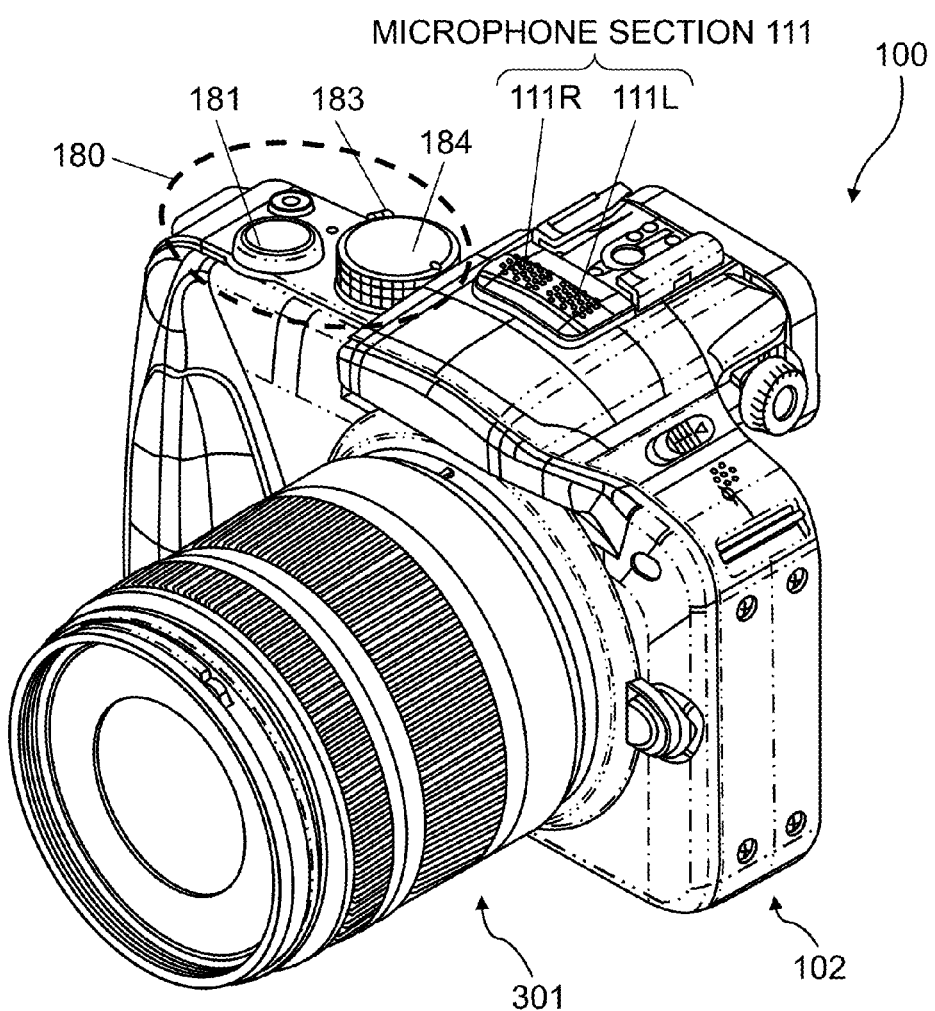
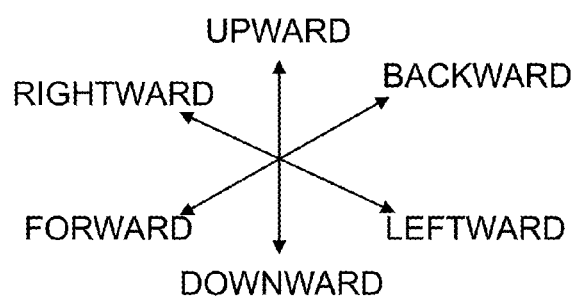

FIG. 2
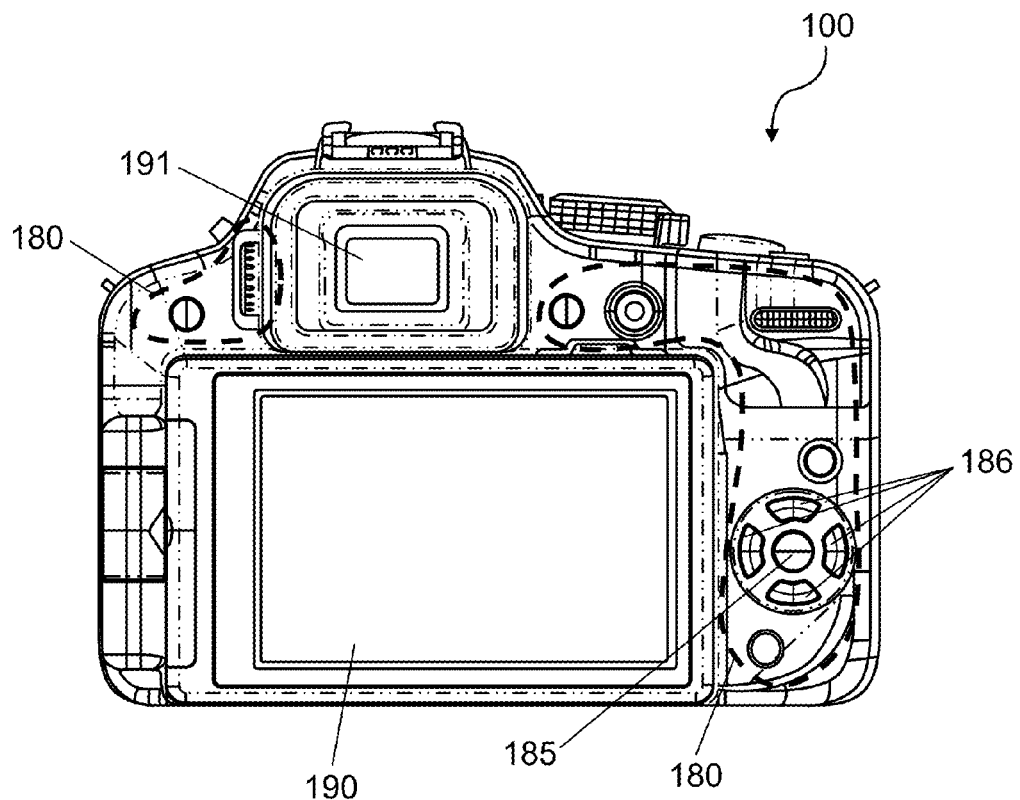
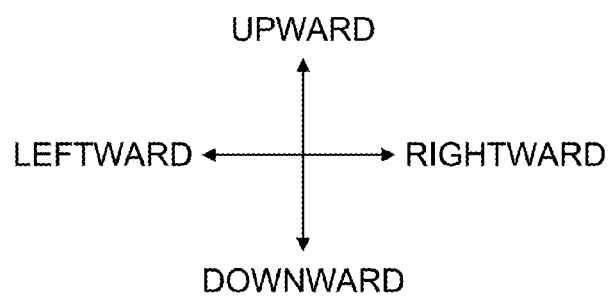

FIG. 7A

SUBJECT DISTANCE: 480mm

|  | IN TERMS OF DEPTH-OF-FOCUS | CONVER-SION | IN TERMS OF SUBJECT-DISTANCE |
|---|---|---|---|
| ON DEPTH-OF-FOCUS BASIS (CONVENTIONAL TECHNIQUE) | 3 PULSES (0.25Fδ) | → | 2.096mm |
| ON SUBJECT-DISTANCE BASIS (THIS TECHNIQUE) | 1 PULSE (NOT EMPLOYED; CONVENTIONAL CONTROL) | ← | 1mm |
| FINALLY DETERMINED CONTROL METHOD (THIS TECHNIQUE) | 3 PULSES (0.25Fδ) |  | 2.096mm |

FIG. 7B

SUBJECT DISTANCE: 125mm

|  | IN TERMS OF DEPTH-OF-FOCUS | CONVER-SION | IN TERMS OF SUBJECT-DISTANCE |
|---|---|---|---|
| ON DEPTH-OF-FOCUS BASIS (CONVENTIONAL TECHNIQUE) | 5 PULSES (0.25Fδ) | → | 0.036mm |
| ON SUBJECT-DISTANCE BASIS (THIS TECHNIQUE) | 134 PULSES | ← | 1mm |
| FINALLY DETERMINED CONTROL METHOD (THIS TECHNIQUE) | 134 PULSES |  | 1mm |

FIG. 7C

SUBJECT DISTANCE: 105mm

|  | IN TERMS OF DEPTH-OF-FOCUS | CONVER-SION | IN TERMS OF SUBJECT-DISTANCE |
|---|---|---|---|
| ON DEPTH-OF-FOCUS BASIS (CONVENTIONAL TECHNIQUE) | 8 PULSES (0.25Fδ) | → | 0.015mm |
| ON SUBJECT-DISTANCE BASIS (THIS TECHNIQUE) | 516 PULSES | ← | 1mm |
| FINALLY DETERMINED CONTROL METHOD (THIS TECHNIQUE) | 516 PULSES |  | 1mm |

IMAGE PICKUP APPARATUS

BACKGROUND

1. Technical Field

The present disclosure relates to an image pickup apparatus.

2. Description of Related Art

An image pickup apparatus disclosed in Japanese Unexamined Application Publication No. 2004-287038 works as follows. The apparatus detects a rotation amount of a focus ring that has no mechanical connection with a focus lens, and moves or stops the focus lens in a direction of the optical axis according to the detection result. When moving or stopping the focus lens in the direction of the optical axis, the image pickup apparatus controls responsiveness of linear changes in focus to the rotation amount of the focus ring according to at least the depth of focus.

SUMMARY

The present disclosure provides a user-friendly image pickup apparatus capable of offering easy focus adjustment, even in macro photographing, when the user uses manual focusing.

The image pickup apparatus of the present disclosure has a focus lens for adjusting focus on a subject, an operating section for accepting user's operation, and a driver section for driving the focus lens in response to the user's operation. The driver section drives the focus lens so that a rotation amount at the operating section, which is required for moving the focus position by unit distance, is maintained at a constant level with no regard to a subject distance.

BRIEF DESCRIPTION OF DRAWINGS

FIG. 1 is a front perspective view of a digital camera in accordance with a first exemplary embodiment;

FIG. 2 is a rear view of the digital camera in accordance with the first exemplary embodiment;

FIG. 7A illustrates control of a focus-movement amount;

FIG. 7B illustrates control of a focus-movement amount;

FIG. 7C illustrates control of a focus-movement amount;

DETAILED DESCRIPTION

Figure 3:
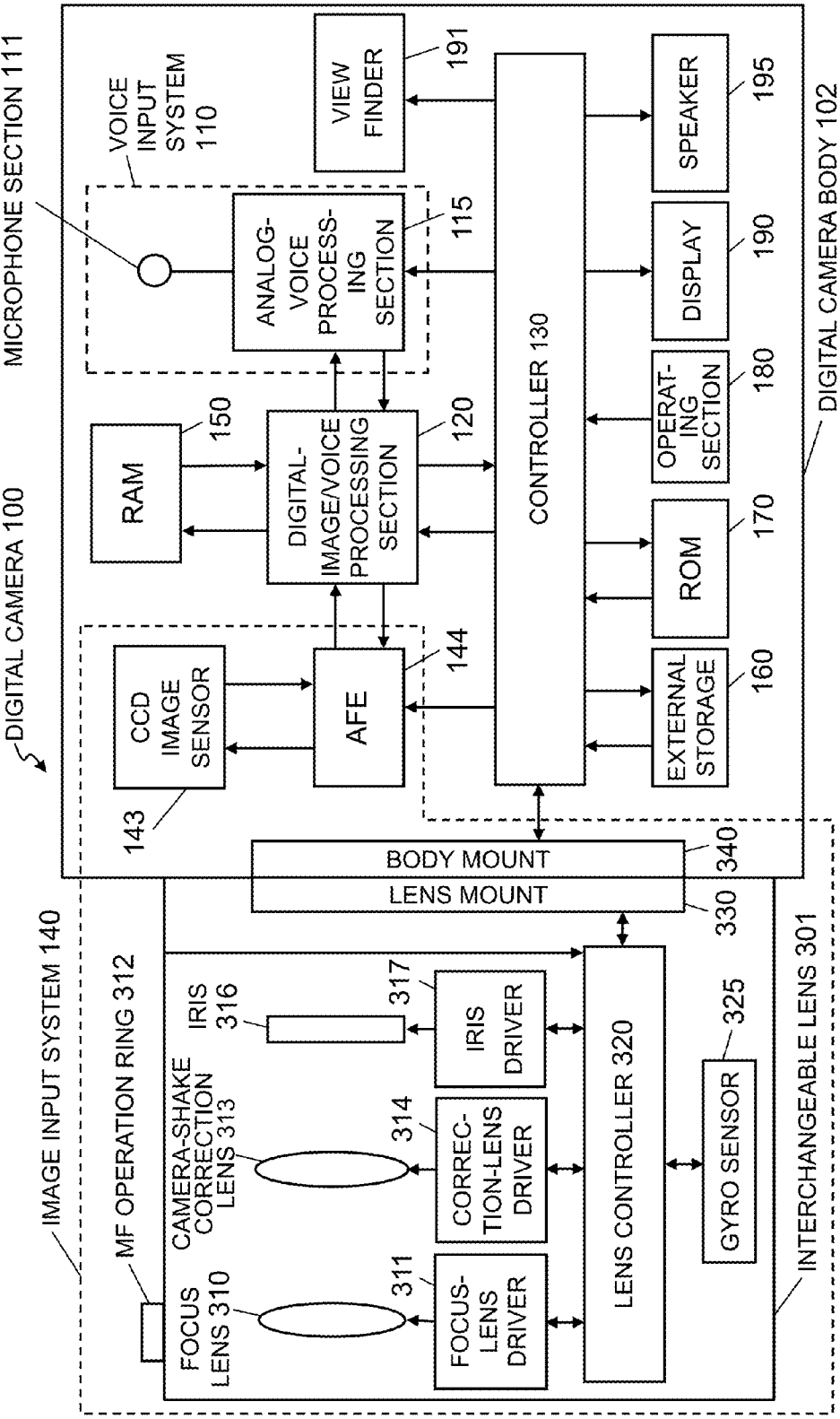
FIG. 3 is a block diagram showing the electrical configuration of the digital camera in accordance with the first exemplary embodiment.

Hereinafter, an exemplary embodiment will be described in detail, with reference to the accompanying drawings. However, details beyond necessity (for example, descriptions on well-known matters or on substantially identical structures) may be omitted to eliminate redundancy from the description below for easy understanding of those skilled in the art.

It is to be understood that the accompanying drawings and the description below are for purposes of full understanding of those skilled in the art and are not to be construed as limitation on the scope of the claimed disclosure.

First Exemplary Embodiment

The first exemplary embodiment will be described below with reference to accompanying drawings. In the drawings to be mentioned below, identical or similar parts have identical or similar reference marks. Dimensional ratios of a structure shown in the drawings may be different from those of the real structure since the structure is schematically shown in them. Therefore, specific dimensions and the like should be understood with reference to the description below. Besides, it will be understood that differences in dimensional ratios and the like are also true between the drawings.

1. Structure

Hereinafter, the structure of digital camera 100 is described with reference to the drawings.

1-1. Structure of Digital Camera 100

FIG. 1 is a front perspective view of digital camera 100. Digital camera 100 has camera body 102 and interchangeable lens 301. Digital camera 100 further contains operating section 180 on the top face. Operating section 180 has release button 181, power switch 183, and mode selection dial 184.

Further, digital camera 100 has microphone section 111, which contains two microphones positioned side by side—microphone 111L on the left and microphone 111R on the right—on the top face of digital camera 100.

FIG. 2 shows the structure, seen from the rear side, of digital camera 100. Digital camera 100 has operating section 180 including center button 185 and cursor button 186, display 190, and view finder 191 on the rear face.

FIG. 3 is a block diagram showing the electrical configuration of digital camera 100. Digital camera 100 has camera body 102 and interchangeable lens 301. Camera body 102 has the following components: CCD image sensor 143; AFE (analog front-end) 144; voice input system 110; digital-image/voice processing section 120; controller 130; RAM 150; external storage 160; ROM 170; operating section 180; display 190; view finder 191; and speaker 195.

Digital camera 100 generates image information and voice signals based on information obtained from outside. The image information is created by image input system 140 and the voice signals are created by voice input system 110. Such created image information and the voice signals undergo A/D conversion and processed in digital image/voice processing section 120. After that, they are stored in external storage 160 such as a memory card. In response to user's operation performed at operating section 180, image information stored in external storage 160 is shown in display 190 and/or view finder 191. Similarly, in response to user's operation performed at operating section 180, the voice signals stored in external storage 160 is outputted from speaker 195.

Hereinafter, the sections shown in FIG. 1 through FIG. 3 will be described in detail.

Image input system 140 has interchangeable lens 301, CCD image sensor 143, and AFE 144.

Interchangeable lens 301 is an optical system having a plurality of lenses. Interchangeable lens 301 has following components: lens controller 320; lens mount 330; focus lens 310; focus-lens driver 311; camera-shake correction lens 313; correction-lens driver 314; iris 316; iris driver 317; MF (manual focus) operation ring 312; and gyro sensor 325 for detecting a camera-shake amount. Focus lens 310 and camera-shake correction lens 313 constitute the optical system.

Lens controller 320 controls the entire interchangeable lens 301. For instance, in response to a user's operation with MF operation ring 312, lens controller 320 requests focus-lens driver 311 to drive focus lens 310. Further, lens controller 320 communicates with controller 130 via lens mount 330. Controller 130 may be formed of a hard-wired electronic circuit or a microcomputer that executes programs.

Lens mount 330 is a connecting member. Together with body mount 340 of camera body 102, it connects mechanically and electrically between interchangeable lens 301 and camera body 102. Under the mechanical and electrical connections established between interchangeable lens 301 and camera body 102, lens controller 320 can communicates with controller 130.

Focus lens 310 changes a focus state of subject image captured into the optical system of interchangeable lens 301 and formed on CCD image sensor 143. The lens structure of focus lens 310 has no specific limitation in the number of lenses and in the number of groups. Based on a control signal sent from lens controller 320, focus-lens driver 311 drives focus lens 310 so as to move forward or backward along the direction of the optical axis of the optical system. For example, a step motor, a DC motor, and an ultrasonic motor can be employed for focus-lens driver 311.

Iris 316 has a plurality of mechanical blades being openable and closeable. Iris 316 is a control member for controlling the amount of light fed into the optical system of interchangeable lens 301. Iris driver 317 changes the open/close state of the mechanical blades based on a control signal sent from lens controller 320. For example, a step motor, a DC motor, and a ultrasonic motor can be employed for iris driver 317.

MF operation ring 312 is an operational member disposed on the outer surface of interchangeable lens 301. MF operation ring 312 is structured so as to have relative rotation to interchangeable lens 301. A rotational position and a rotational speed of MF operation ring 312 are detected by a detector (not shown) and the detection results are sent to lens controller 320. Based on the rotational position and the rotational speed of MF operation ring 312, lens controller 320 supplies focus-lens driver 311 with a drive control signal. Lens controller 320 transmits a drive control signal to focus-lens driver 311 so as to drive focus lens 310 according to the rotation of MF operation ring 312.

Body mount 340 is a connecting member. Together with lens mount 330 of interchangeable lens 301, it connects mechanically and electrically between interchangeable lens 301 and camera body 102. Under the mechanical and electrical connections established between interchangeable lens 301 and camera body 102, lens controller 320 can communicates with controller 130. Receiving an exposure synchronization signal and other control signals from controller 130, body mount 340 transmits them to lens controller 320 via lens mount 330. Similarly, receiving a signal from lens controller 320, body mount 340 transmits it to controller 130 via lens mount 330.

CCD image sensor 143 generates image information by taking an image of a subject image captured by interchangeable lens 301. On the photo-receiving surface of CCD image sensor 143, a plurality of photodiodes is arranged two dimensionally (in a matrix). Besides, primary color filters (R, G and B) are disposed in a predetermined array structure such that each corresponds to each photodiode. The light from a subject as a photo object passes through interchangeable lens 301 and then forms a subject image on the photo-receiving surface of DDC image sensor 143. The subject image is converted into color information of R, G, or B according to the amount of light captured into each photodiode. The image information that shows the entire image of a subject is thus produced. Each photodiode has correspondence with each pixel of CCD image sensor 143. However, color information outputted from each photodiode is any one of the three primary-color (R, G, B) information. The color to be actually shown by each pixel is generated by digital-image/voice processing section 120 based on primary-color information (relating to color and an amount of light) outputted from the photodiode corresponding to each pixel and peripherally disposed other photodiodes. When digital camera 100 is in a shooting mode, CCD image sensor 143 generates image information of a new frame at regular time intervals.

In AFE 144, the image information read out of CCD image sensor 143 undergoes the following processes: noise suppression by correlated dual sampling; amplification by an analog gain controller so as to be suitable for the input range width of the A/D converter; and A/D conversion by the A/D converter. After the processes above, AFE 144 outputs the image information to digital-image/voice processing section 120.

Voice input system 110 has microphone section 111 and analog-voice processing section 115. Microphone section 111 contains microphone 111L and microphone 111R. Microphone section 111 converts an acoustical signal into an electrical signal by each microphone and transmits it to analog-voice processing section 115. Receiving the processed signal, analog-voice processing section 115 provides the signal with A/D conversion by an A/D converter and outputs the voice signal to digital-image/voice processing section 120.

Digital-image/voice processing section 120 receives the image information outputted from AFE 144 and the voice signal outputted from analog-voice processing section 115, and provides them with various processes. Specifically, as for the image information, digital-image/voice processing section 120 provides it with gamma correction, white balance correction, defect correction, and encoding according to instruction from controller 130. As for the voice signal, digital-image/voice processing section 120 provides it with predetermined processes. Digital-image/voice processing section 120 may be formed of a hard-wired electronic circuit or a microcomputer that executes programs. Further, digital-image/voice processing section 120 may be incorporated into one semiconductor chip together with controller 130.

Digital-image/voice processing section 120 provides the output from microphone section 111 with arithmetic processing and performs directivity synthesis as an acoustic zoom process.

Display 190 is disposed on the rear face of digital camera 100. Display 190 described in the exemplary embodiment is a liquid crystal display. Based on image information processed in digital-image/voice processing section 120, display 190 shows images, such as a through-image and a play-back image. The through-image is an image of a frame continuously and newly produced at regular time intervals. Commonly, when digital camera 100 is in the stand-by mode—where digital camera 100 is set in the shooting mode but not yet performing still-image shooting—or when digital camera 100 is in the video shooting mode, digital-image/ voice processing section 120 produces through-image based on the image information generated by CCD image sensor 143. Viewing the through-image shown in display 190 allows the user to determine the composition of a subject before shooting. The play-back image is produced by digital-image/voice processing section 120 when digital camera 100 is in the play-back mode. The play-back image is an image of low pixel density, which is formed in a way that an image of high pixel density recorded in external storage 160 is scaled down so as to be suitable for the size of display 190. The image information of high pixel density, which is to be recorded in external storage 160, is generated by digital-image/voice processing section 120, based on image information generated by CCD image sensor 143, after acceptance of user's predetermined operation on release button 181. Speaker 195 outputs a voice signal recorded in external storage 160. The contents shown in display 190 may be similarly shown by view finder 191.

Controller 130 has control over the entire digital camera 100.

ROM 170 stores programs to be performed by controller 130, that is, the programs relating to auto-focus control (AF control), auto exposure control (AE control), and flash on/off control. ROM 170 also stores the programs used for overall control on the workings of digital camera 100. Further, ROM 170 stores necessary conditions and setting for digital camera 100. ROM 170 described in the embodiment is a flash ROM.

Controller 130 may be formed of a hard-wired electronic circuit or a microcomputer that executes programs. Further, controller 130 may be incorporated into one semiconductor chip together with digital-image/voice processing section 120. ROM 170 is not necessarily disposed outside controller 130 (as a structure separate from controller 130); it may be incorporated in controller 130.

RAM 150 is working memory for digital-image/voice processing section 120 and controller 130. SDRAM and flash memory is employed for RAM 150. RAM 150 also works as internal memory for recording image information and a voice signal.

External storage 160 is external memory having a non-volatile recording section such as flash memory. External storage 160 stores image information and a voice signal to be processed in digital-image/voice processing section 120.

Operating section 180 collectively represents an operation interface, such as an operation button and an operation dial, which is disposed on the exterior of digital camera 100. Operating section 180 accepts user's operation. For example, release button 181, power switch 183, mode selection dial 184, center button 185, and cursor button 186 (shown in FIG. 1 through FIG. 3) belong to operating section 180. In response to user's operation, operating section 180 transmits to controller 130 a signal for instructing operation that corresponds to the user input.

Release button 181 is a push button having two-step pushing: half push and full push. In response to user's half push on release button 181, controller 130 performs AF (Auto Focus) control and/or AE (Auto Exposure) control to determine shooting conditions. In the AF control, digital-image/voice processing section 120 calculates a contrast value at a predetermined part of image information. According to the calculation results, controller 130 drives interchangeable lens 301, and performs feedback control so as to obtain a maximized contrast value. The AF control allows controller 130 to have a focal length between the lens and an AF-controlled subject. Further, the AF control allows interchangeable lens 301 to form a subject image of the AF-controlled subject on CCD image sensor 143. When the user fully pushes half-pushed release button 181, controller 130 stores the image information taken at a timing of user's full push into external storage 160.

Power switch 183 is a slide switch for on/off control of power supply to each section of digital camera 100. In the power-off state of digital camera 100, when the user operates power switch 183 to have a rightward slide, controller 130 starts to supply each section of the camera with electric power for driving them. Conversely, in the power-on state of digital camera 100, when the user operates power switch 183 to have a leftward slide, controller 130 stops power supply to each section of the camera.

Mode selection dial 184 is a rotary dial. When the user rotates mode selection dial 184, controller 130 changes the operation mode of digital camera 100 so as to correspond to the current position after rotation of mode selection dial 184. The operation mode is, for example, an auto-shooting mode, a manual-shooting mode, and a scene-selection mode.

Center button 185 is a push button. In the shooting mode or in the play-back mode of digital camera 100, when the user pushes center button 185, controller 130 shows a menu on display 190. The menu is a screen from which the user can select and set various conditions on shooting and play-back. When the user pushes center button 180 while viewing a selected value on setting items or setting conditions shown on the menu, the value is set to the item and is stored in ROM 170.

Cursor button 186 has four push buttons disposed on the left, right, top, and bottom. The user selects values on setting items or setting conditions shown on the menu by pushing any one of the four buttons.

1-2. Positional Relationship

Digital camera 100 is an example of the image pickup apparatus of the present invention. MF operation ring 312 is an example of the operating section of the present invention. Focus-lens driver 311 is an example of the driver section of the present invention. Gyro sensor 325 is an example of the camera-shake detector of the present invention. Lens controller 320 is an example of the controller of the present invention.

2. Operation

Next, an outline of the operation of digital camera 100 of the embodiment will be described.

Figure 4:
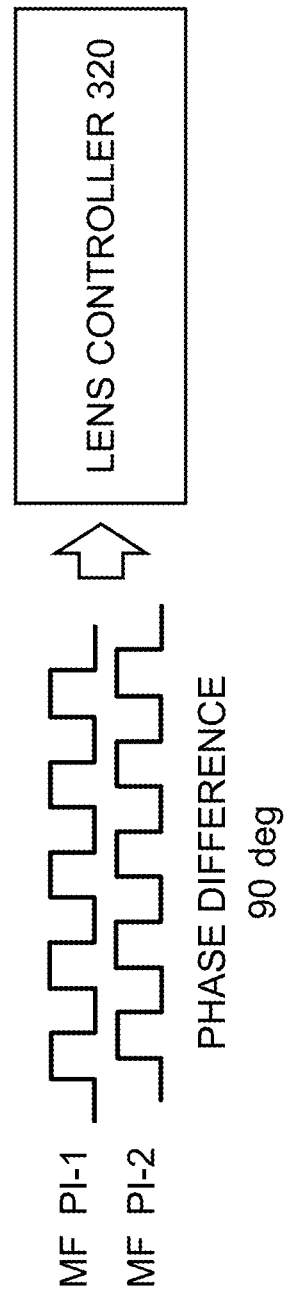
FIG. 4 shows signals for detecting a rotation of a manual focus ring.

FIG. 4 illustrates a method for detecting rotation in response to movement of MF operation ring 312. When the user rotates MF operation ring 312 disposed on the outer periphery of the lens barrel, a photo-interrupter (PI) outputs a PI pulse to lens controller 320. Based on the pulse information, lens controller 320 detects rotating direction, rotating speed, and rotation amount of MF operation ring 312.

According to the rotating direction of MF operation ring 312, lens controller 320 determines whether focus lens 310 should be moved in the infinity direction or in the close-up direction, and thereby controls focus-lens driver 311. Also, according to the rotating speed (PI-pulse output frequency) of MF operation ring 312, lens controller 320 determines whether focus lens 310 should be operated on a speed-based control or a position-based control, and thereby controls focus-lens driver 311. In the speed-based control, lens controller 320 controls focus-lens driver 311 so that focus lens 310 moves between the infinity position and the closest position in a predetermined time according to the PI-pulse output frequencies. In the position-based control, lens controller 320 controls focus-lens driver 311 on the determination of a focus-movement amount according to the number of the PI output pulses. As for the position-based control, in particular, lens controller 320 performs a control specific to macro lenses for determination of the focus-movement amount.

Figure 5A:
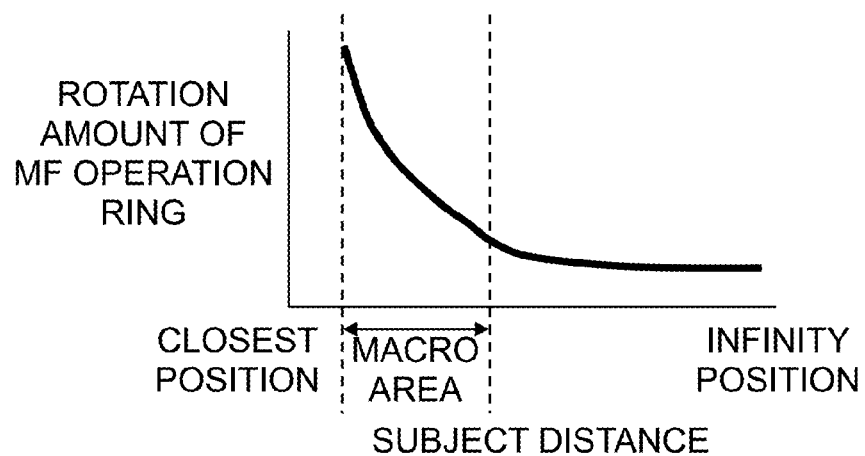
FIG. 5A is a graph showing a relationship between a subject distance and a rotation amount occurred in manual focus (MF) operation.

According to a conventional focus-lens control, as shown in FIG. 5A, the shorter the distance between the lens and the subject, the greater the operation amount at the operating section for moving a focus position by unit distance. That is, when the lens comes closer to the subject (i.e., in the macro area), a focus-movement amount (the number of pulses) with respect to the subject distance becomes greater. The focus-movement amount corresponds to the number of pulses, and thus the unit of the focus-movement amount can be translated into 'pulse'. Suppose that the user is adjusting the focus on a subject in the macro area, while rotating MF operation ring 312 to move the lens from the infinity position to the close-up position. At that time, even when MF operation ring 312 is rotated at a constant speed, changes in subject distance become smaller in the macro area. Therefore, to obtain correct focus to the subject, the user has to rotate MF operation ring 312 by a large amount, resulting in poor convenience of operation.

Figure 5B:
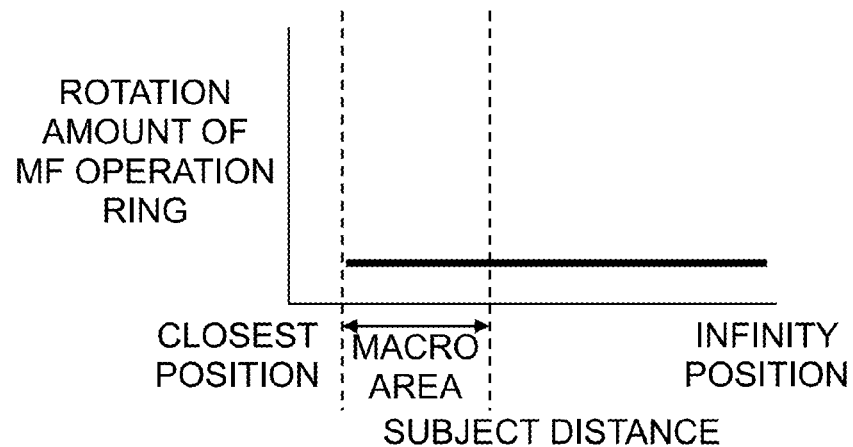
FIG. 5B a graph showing a relationship between a subject distance and a rotation amount occurred in MF operation.

According to the technique of the present disclosure, as shown in FIG. 5B, lens controller 320 calculates the subject distance from the current position of the focus lens so that the operation amount (rotation amount) at the operating section to move the focus position by unit distance is maintained at a constant amount regardless of subject distance. That is, lens controller 320 controls focus-lens driver 311 so that the focus-movement amount (pulse) per unit subject distance is maintained at a constant amount. In this way, focus-lens driver 311 is driven by lens controller 320 so that the operation amount (rotation amount) at the operating section to move the focus position by unit distance is maintained at a constant amount regardless of subject distance even when MF operation ring 312 is rotated at a constant speed.

Figure 6:
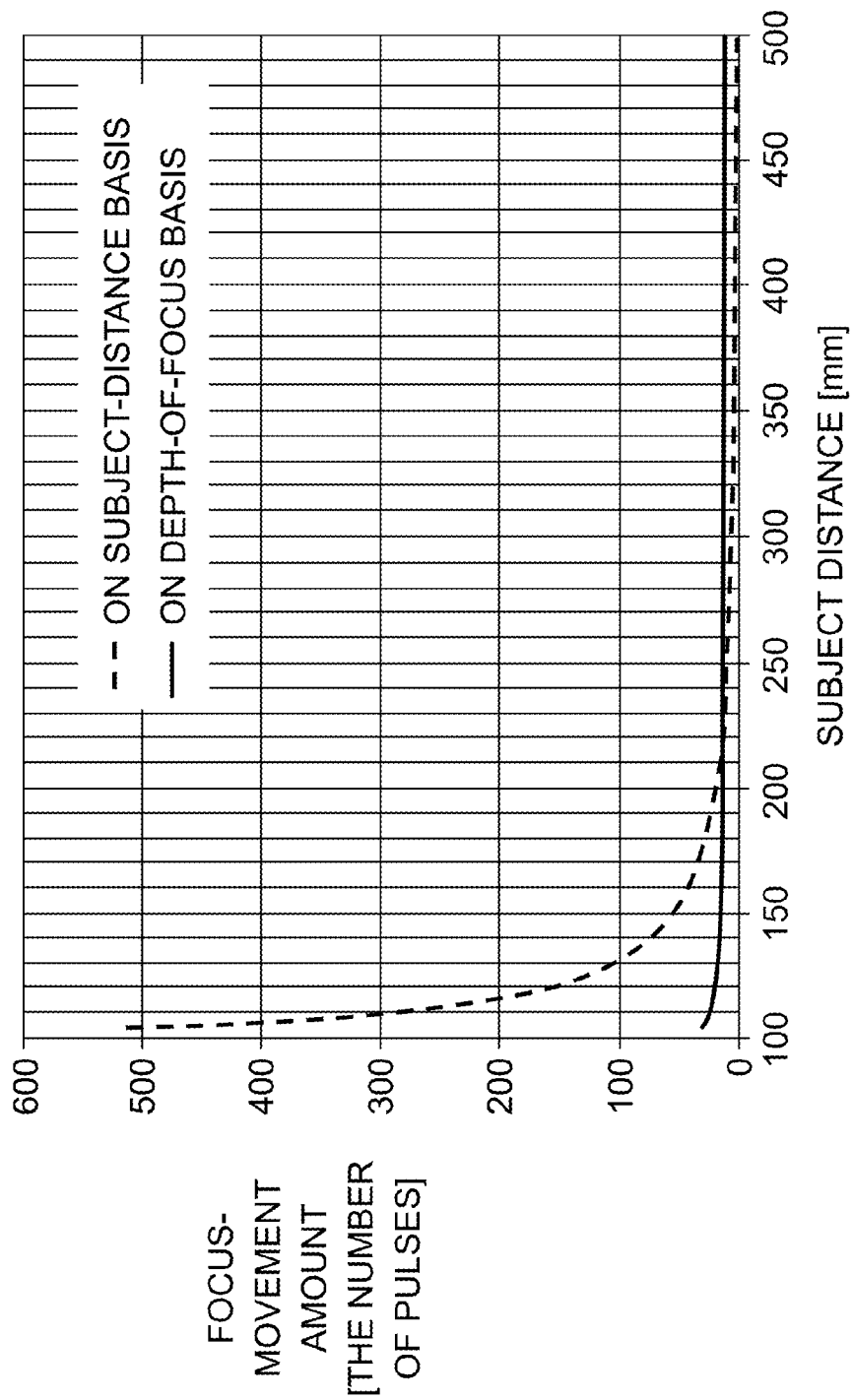
FIG. 6 is a graph showing a relationship between a subject distance and a focus-movement amount.

Next, the technique of the present disclosure will be described hereinafter, showing specific examples. FIG. 6 is a graph showing relationship between a focus-movement amount (pulse) with the depth of focus of 1Fδ and a focus-movement amount (pulse) by subject distance of 1 mm when MF operation ring 312 is rotated at extremely low speed. The graph apparently shows that, in the macro area, particularly in the area closer than the subject distance of 225 mm, the focus-movement amount per subject distance of 1 mm becomes gradually greater, and it becomes extremely high in the closest area. This is only true for macro lenses; in other lenses, the difference—between the focus-movement amount (pulse) with the depth of focus of 1Fδ and the focus-movement amount (pulse) per subject distance of 1 mm—is little, and therefore it causes little adverse effect. That is, as for other lenses except for macro lenses, employing the focus-movement amount calculated from a conventional focus-movement amount (pulse) with the depth of focus of 1Fδ has no problem and achieves good operability. In 'the depth of focus of 1Fδ' mentioned above, 'F' is the f-number and 'δ' is the diameter of a permissible circle of confusion.

Other specific example will be described with reference to FIG. 7A through FIG. 7C. Each of FIG. 7A, FIG. 7B, and FIG. 7C is a comparative table between the conventional technique and the technique of the present disclosure, showing a focus-movement amount that corresponds to one pulse of PI output pulses when MF operation ring 312 is rotated.

The results of the three tables are obtained with different subject distances: 480 mm (FIG. 7A), 125 mm (FIG. 7B), and 105 mm (FIG. 7C).

In the case where the subject distance measures 480 mm (FIG. 7A), i.e., in the area outside of the macro area, when MF operation ring 312 is rotated at an extremely low speed, the focus-movement amount (as one pulse of PI output pulses) corresponds to three pulses with the depth of focus of 0.25 Fδ, which is equivalent to 2.096 mm on a subject-distance basis. That is, the conventional control—where the focus-movement amount (pulse) is determined on the basis of the depth of focus—has no problem.

In the macro area, however, the focus-movement amount by subject distance of 1 mm gradually becomes greater. In FIG. 7B that shows results when the subject distance measures 125 mm, the focus-movement amount corresponds to five pulses with the depth of focus of 0.25 Fδ, which is equivalent to 0.036 mm on a subject-distance basis. To address above, calculation of the focus-movement amount is not based on the depth of focus, but determined so that the focus-movement amount (pulse) by unit subject distance remains constant. Such obtained focus-movement amount by subject distance of 1 mm corresponds to 134 pulses.

Further, when the subject distance measures 105 mm as the shortest distance (FIG. 7C), the focus-movement amount corresponds to eight pulses with the depth of focus of 0.25 Fδ, which is equivalent to 0.015 mm on a subject-distance basis. Like the case above, calculation of the focus-movement amount is determined in a manner that the focus-movement amount by unit subject distance remains constant. Such obtained focus-movement amount by subject distance of 1 mm corresponds to 516 pulses.

The focus-movement amount (pulse) by subject distance of 1 mm is changeable according to the rotation speed of MF operation ring 312 or it is adjustable by parameter setting. Further, the following way may be applicable to the control. That is, the focus-movement amount is calculated for two cases: the depth-of-focus basis and the subject-distance basis. Specifically, such obtained two results are compared with each other and the greater one is finally employed for the focus-movement amount control.

In focus adjustment by manual operation, conventionally, the focus-movement amount is calculated so that the depth of focus maintains constant according to the output amount of pulses of MF operation ring 312. Under the control, the shorter the subject distance, the greater the rotation amount of MF operation ring 312 to focus the lens on a subject. That is, as for shooting in the macro area, the user has to rotate MF operation ring 312 by a large amount to change a focus position and obtain the correct focus on the subject. The conventional control has difficulty in focus adjustment and fails to offer user-friendly operations. In particular, due to its long stroke to focus, when using a macro lens, MF operation ring 312 has to be rotated a lot to move the focus position of the lens from the infinity position to the closest position. The conventional focus adjustment fails to quickly achieve MF adjustment in pan-shooting or in seeking a good composition of a subject where quickness in motion is more desired than sharpness in focus, resulting in lack of user-friendly operations.

As described above, in the conventional MF adjustment on a subject in the macro area, the closer the lens comes to the subject, the greater the rotation amount of MF operation ring 312. However, the control of the present disclosure described above achieves comfortable MF adjustment—even in macro shooting—with a constant rotation amount of ring 312.

Next, a technique to change the way of driving focus lens 310 according to a camera-shake amount of digital camera 100 will be described.

Gyro sensor 325 is a device capable of detecting a camera-shake amount. Receiving the information from gyro sensor 325, lens controller 320 determines whether or not the detected camera-shake amount is greater than a predetermined amount during a specific period of time. If the detected amount is not more than the predetermined amount, lens controller 320 determines the state as a first state. If the detected amount is greater than the predetermined amount, it determines the state as a second state. That is, according to the magnitude of the camera-shake amount, lens controller 320 changes a focus-movement amount (pulse), with no regard to the detection amount in response to rotating operation on MF operation ring 312 by the user.

For example, the first state may correspond to a case where the user performs fine focus-adjustment by manual focusing with the camera being mounted on a tripod or firmly held in user's hand. In the first state, lens controller 320 puts weight on MF focusing precision (i.e., precision of focus adjustment in manual focusing), and decreases a focus-movement amount to the rotation amount of MF operation ring 312. The second state may correspond to a case where a quick focus-adjustment is desired rather than a fine focus-adjustment in manual pan-shooting or in seeking a good composition of a subject. In the second state, lens controller 320 puts weight on MF focusing speed (i.e., speed of focus adjustment in manual focusing), and increases a focus-movement amount to the rotation amount of MF operation ring 312.

Figure 8:
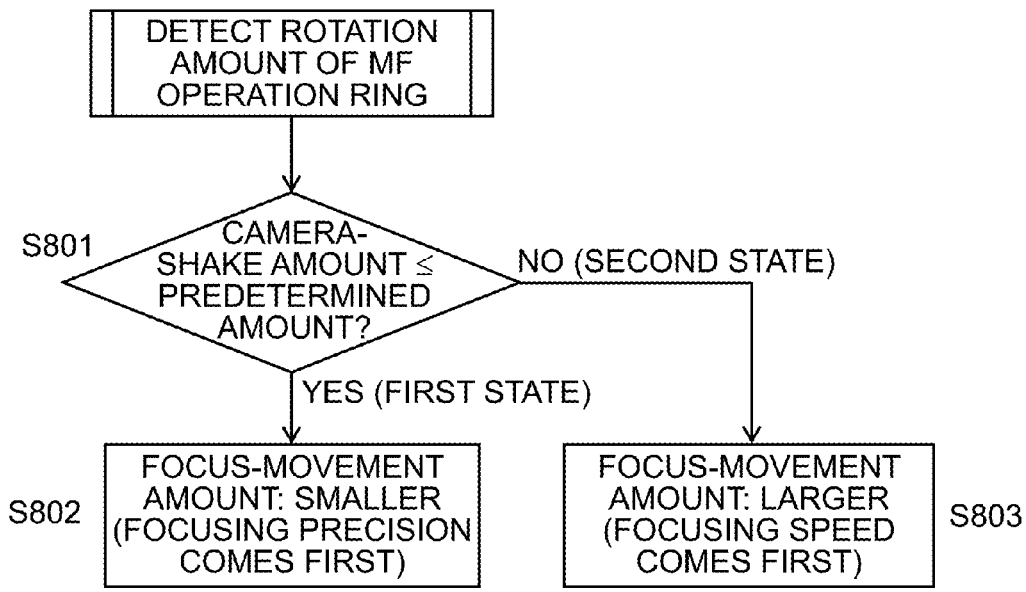
FIG. 8 is a flowchart illustrating the operation for changing focus-lens drive in response to a camera-shake amount of the digital camera in accordance with the first exemplary embodiment.

FIG. 8 is a flowchart illustrating the operation for changing focus-lens drive in response to a camera-shake amount of digital camera 100. Receiving information from gyro sensor 325, lens controller 320 calculates a camera-shake amount occurred in a specific period of time. If the calculated amount is not more than a predetermined amount, lens controller 325 determines the state as the first state; otherwise, determines as the second state (step S801). In the first state, focus-lens driver 311 employs a first driving mode (step S802). In the second state, it employs a second driving mode (step S803). In the first driving-state, a driving amount of focus lens 310 is smaller, i.e., a focus-movement amount is smaller than that in the second driving mode.

The drive control above offers focus-adjustment suitable for a shooting scene selected by the user. That is, it offers fine focus-adjustment when the user needs MF fine focus-adjustment, or it offers focus-adjustment with quick response when the user needs a quick, though approximate, focus-adjustment.

The determination whether a state corresponds to the first state or the second state may be based on selection information on a camera-shake correcting switch on the lens side or a camera-shake correction mode on the camera-body side. Further, it would be understood that the focus-movement amount should be changed with linearity according to the camera-shake amount, not completely separating between the first state and the second state.

OTHER EXEMPLARY EMBODIMENTS

The structure described in the first exemplary embodiment is an example of the technique of the present disclosure. The technique of the present disclosure is not limited to the above and also applicable to other structures with modification, replacement, addition, and omission. Further, a new structure can be developed by combining the components described in the first exemplary embodiment.

It will be understood that the structure described above is merely an example of the technique of the present disclosure. Hence, the technique of the present disclosure is not limited to the structure described above, allowing modification, replacement, addition, and omission without departing from the spirit and scope of the claimed invention.

Digital camera 100 described in the exemplary embodiment is an example of an image pickup apparatus of the present disclosure; other than a digital camera, a movie camera can be an example of the image pickup apparatus of the present disclosure.

The application is based on Japanese Patent Application (No. 2015-068983) filed on Mar. 30, 2015, the contents of which are incorporated herein by reference.

INDUSTRIAL APPLICABILITY

The image pickup apparatus of the present disclosure provides users with user-friendly focus adjustment in manual focusing operation, even when focusing a subject located in the macro area. It is therefore useful for an image pickup apparatus.

What is claimed is:

1. An image pickup apparatus comprising:
a focus lens for adjusting focus on a subject;
an operating section for accepting user's operation; and
a driver for driving the focus lens in response to the user's operation,
wherein, the driver drives the focus lens so that a rotation amount at the operating section, which is required for moving a focus position by unit distance, is maintained at a constant level with no regard to a subject distance that includes a macro area.

2. An image pickup apparatus comprising:
a focus lens for adjusting focus on a subject;
an operating section for accepting user's operation;
a camera-shake detector for detecting a camera-shake amount of a lens barrel;
a driver for driving the focus lens in response to the user's operation; and
a controller for controlling the driver,
wherein, the controller controls the driver so that the driver works on a first state when the camera-shake amount detected by the camera-shake detector is not more than a predetermined value, while the driver works on a second state that differs from the first state when the camera-shake amount detected by the camera-shake detector exceeds the predetermined value.

3. The image pickup apparatus of claim 2, wherein a drive amount of the focus lens in the first state is smaller than a drive amount of the focus lens in the second state.

* * * * *